(No Model.)
T. A. EDISON.
METHOD OF MANUFACTURING INCANDESCING ELECTRIC LAMPS.
No. 287,518. Patented Oct. 30, 1883.
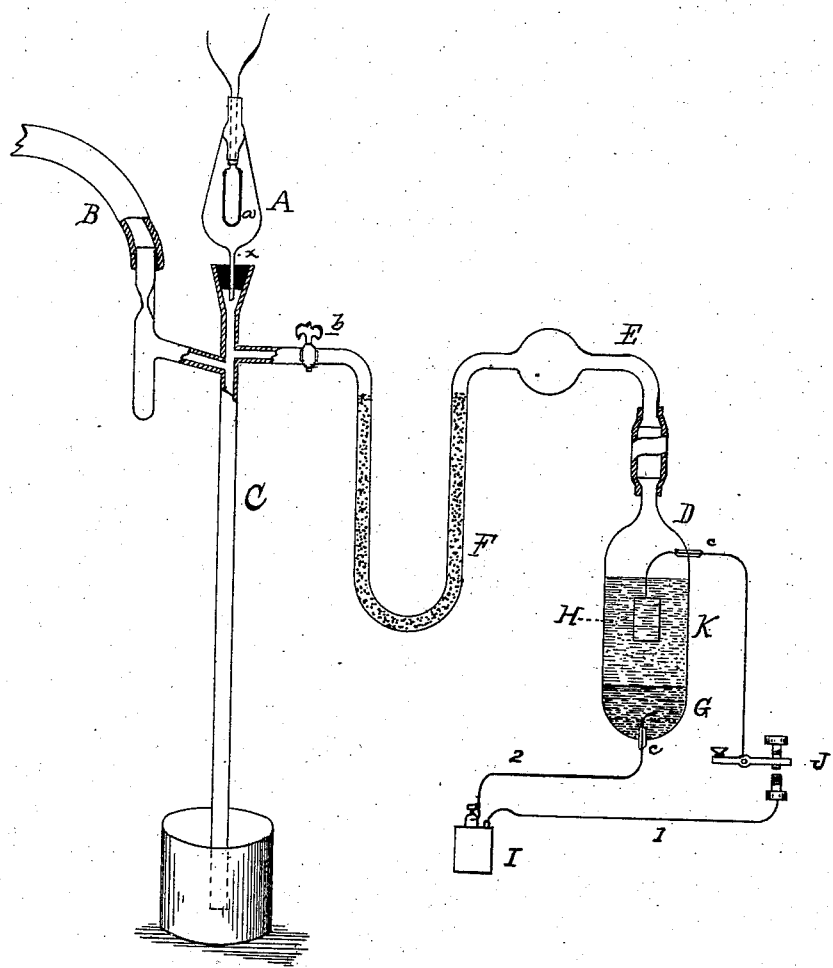
WITNESSES:
INVENTOR:

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

METHOD OF MANUFACTURING INCANDESCING ELECTRIC LAMPS.

SPECIFICATION forming part of Letters Patent No. 287,518, dated October 30, 1883.

Application filed September 13, 1882. (No model.)

*To all whom it may concern:*

Be it known that I, THOMAS A. EDISON, of Menlo Park, in the county of Middlesex and State of New Jersey, have invented a new and useful Improvement in the Manufacture of Incandescing Electric Lamps, (Case No. 481,) of which the following is a specification.

The object of my invention is to render the carbon filaments which form incandescing-conductors of electric lamps more durable in use. I accomplish this by first exhausting the lamp-globe as completely as possible by means of a Sprengel vacuum-pump, and then filling the globe with pure hydrogen, free from moisture, to an atmospheric pressure. I then heat the carbon filament by an electric current to a much higher temperature than that to which it is to be subjected in use. It being subjected to atmospheric pressure during such heating, the carbon becomes more compact. The hydrogen is then exhausted, and the carbon is again heated to high incandescence, to remove any of the gas which may remain within its pores, after which the lamp is sealed off from the pump.

Instead of filling the globe with hydrogen, I may employ any other inert gas—such as chlorine gas; but hydrogen is preferable.

In carrying out my invention I may employ the apparatus illustrated in the drawing.

A represents the inclosing-globe of an incandescing electric lamp, and *a* the carbon filament. The lamp is attached to a Sprengel pump, of which B is the supply-tube, and C the fall-tube.

D is a glass vessel, connected by a tube, E, with the vacuum-pump. A portion of the tube is filled with phosphoric-anhydride, F, or other similar drying agent, and the tube is provided with a stop-cock, *b*.

In the bottom of the vessel D is placed an amalgam of mercury and zinc, G, and above this is placed a quantity of sulphuric acid and water, K, in which is immersed a plate, H, of platinum.

From a battery, I, wires 1 2 run, respectively, to the platinum plate H and to the amalgam G. Such wires each have a small portion, at *c*, of platinum sealed into glass, the latter being sealed into the glass of the vessel D. A key, J, is provided for opening and closing the battery-circuit.

The operation is as follows: The air is first exhausted from the lamp-globe and from the vessel D by the Sprengel pump, the stop-cock *b* and key J being open. The operation of the pump is then stopped and the circuit 1 2 closed. The liquid K in the vessel D is decomposed by the current, and the oxygen combines with the zinc of the amalgam, to form an oxide of zinc, which combines with the sulphuric acid, to form sulphate of zinc. Pure hydrogen is therefore given off, which enters the lamp-globe, a sufficient amount being allowed to enter to produce an atmospheric pressure therein, after which the stop-cock *b* is closed and circuit 1 2 is opened, so that no more hydrogen can enter the pump. The carbon filament is then electrically heated through the wires 3 4 to a higher incandescence than that at which it is intended to be used. The hydrogen is then pumped out, after which the carbon is again electrically heated, the pump still continuing in operation, the residual and occluded gases being thus almost completely removed. The lamp is sealed off at *x*, and is then ready for use.

Where another gas than hydrogen is used, suitable apparatus for generating the same would be similarly connected with the lamp and pump.

What I claim is—

1. The method of manufacturing incandescing electric lamps, which consists in charging the globe of a lamp with pure hydrogen or equivalent inert gas, next heating the conductor within said globe to incandescence by an electric current, removing said gas from the globe, and finally sealing off said globe, substantially as set forth.

2. The method of treating the carbon filaments of incandescing electric lamps, consisting in heating them to a higher incandescence than that at which they are intended to be used in an atmosphere of pure hydrogen or equivalent inert gas, substantially as set forth.

3. The method of treating the carbon filaments of an incandescing electric lamp, consisting in first exhausting the air from the globe inclosing the filament, and replacing it by pure hydrogen or equivalent inert gas, heating the conductor to incandescence by an electric current, removing the hydrogen from the globe, and again heating the filament, the operation of the exhausting apparatus being continued during this latter heating, substantially as set forth.

This specification signed and witnessed this 25th day of August, 1882.

THOS. A. EDISON.

Witnesses:
H. W. SEELY,
EDWARD H. PYATT.